(12) United States Patent
Austin et al.

(10) Patent No.: US 6,830,688 B2
(45) Date of Patent: Dec. 14, 2004

(54) INTEGRATED HYDROPONIC AND WETLAND WASTEWATER TREATMENT SYSTEMS AND ASSOCIATED METHODS

(75) Inventors: David C. Austin, Taos, NM (US); David J. Maciolek, Ranchos de Taos, NM (US); J. Rob von Rohr, Des Montes, NM (US)

(73) Assignee: Dharma Living Systems, Inc., Taos, NM (US)

(*) Notice: Subject to any disclaimer, the term of this patent is extended or adjusted under 35 U.S.C. 154(b) by 188 days.

(21) Appl. No.: 10/294,456

(22) Filed: Nov. 14, 2002

(65) Prior Publication Data

US 2003/0111408 A1 Jun. 19, 2003

Related U.S. Application Data

(60) Provisional application No. 60/389,637, filed on Jun. 18, 2002, and provisional application No. 60/333,203, filed on Nov. 14, 2001.

(51) Int. Cl.$^7$ .............................. C02F 3/06; C02F 3/30; C02F 3/32
(52) U.S. Cl. ...................... 210/602; 210/605; 210/747; 210/170; 210/194; 210/631
(58) Field of Search ................. 210/602, 605, 210/631, 747, 170, 194; 47/62 R, 62 N

(56) References Cited

U.S. PATENT DOCUMENTS

| | | |
|---|---|---|
| 681,884 A | 9/1901 | Monjeau |
| 2,306,027 A | 12/1942 | Swaney |
| 2,486,512 A | 11/1949 | Armstrong |
| 2,822,329 A | 2/1958 | Griffith |
| 3,385,786 A | 5/1968 | Klock |
| 3,563,888 A | 2/1971 | Klock |
| 3,598,726 A | 8/1971 | Welch |
| 3,768,200 A | 10/1973 | Klock |
| 3,770,623 A | 11/1973 | Seidel |
| 3,925,206 A | 12/1975 | Dea |
| 4,008,159 A | 2/1977 | Besik |
| 4,057,933 A | 11/1977 | Enyeart |
| 4,169,050 A | 9/1979 | Serfling et al. |
| 4,267,038 A | 5/1981 | Thompson |
| 4,277,342 A | 7/1981 | Hayes et al. |
| 4,284,508 A | 8/1981 | Jewell |
| 4,331,538 A | 5/1982 | Kickuth |
| 4,333,837 A | 6/1982 | Plósz et al. |
| 4,415,450 A | 11/1983 | Wolverton |

(List continued on next page.)

FOREIGN PATENT DOCUMENTS

| | | |
|---|---|---|
| DE | 1916044 | 11/1969 |
| DE | 3941211 | 6/1991 |
| GB | 1 579 623 | 11/1980 |
| GB | 2 182 651 | 5/1987 |
| JP | 58-70891 | 4/1983 |
| SU | 1346588 | 10/1987 |
| WO | WO 95/17351 | 6/1995 |

OTHER PUBLICATIONS

Solar Aqua Sstyems, Inc. Marketing brochure, 1978.
Reed, Sherwood and Bastian, Robert, "Aquaculture Systems for Wastewater Treatment: An Engineering Assessment," U.S. Environmental Protection Agency Office of Water Program Operations Municipal Construction Division, 132 pages, Jun. 1980.

(List continued on next page.)

Primary Examiner—Robert A. Hopkins
(74) Attorney, Agent, or Firm—Allen, Dyer, Doppelt, Milbrath & Gilchrist, P.A.

(57) ABSTRACT

The wastewater treatment systems have a plurality of treatment modules between the inlet and the outlet, each for treating water with a selected process. Influent is directed to a covered anaerobic reactor, and then to an attached growth pretreatment filter that is at least intermittently exposed to atmospheric oxygen. Following the filter are a first and a second hydroponic reactor in series, followed in turn by a vertical-flow wetland. A second embodiment includes, following the filter, two or more tidal vertical-flow wetlands in series, and a pump for recycling water exiting the final wetland upstream of the filter.

42 Claims, 6 Drawing Sheets

U.S. PATENT DOCUMENTS

| | | |
|---|---|---|
| 4,443,337 A | 4/1984 | Otani et al. |
| 4,482,458 A | 11/1984 | Rovel et al. |
| 4,620,931 A | 11/1986 | Hirata et al. |
| 4,678,582 A | 7/1987 | Lavigne |
| 4,793,929 A | 12/1988 | Kickuth et al. |
| 4,839,051 A | 6/1989 | Higa |
| 4,872,985 A | 10/1989 | Dinges |
| 4,895,645 A | 1/1990 | Zorich, Jr. |
| 4,904,386 A | 2/1990 | Kickuth |
| 4,921,604 A | 5/1990 | Moellenbeck |
| 4,959,084 A | 9/1990 | Wolverton et al. |
| 4,997,568 A | 3/1991 | Vandervelde et al. |
| 5,078,882 A | 1/1992 | Northrop |
| 5,087,353 A | 2/1992 | Todd et al. |
| 5,137,625 A | 8/1992 | Wolverton |
| 5,174,897 A | 12/1992 | Wengrzynek |
| 5,337,516 A | 8/1994 | Hondulas |
| 5,389,257 A | 2/1995 | Todd et al. |
| 5,486,291 A | 1/1996 | Todd et al. |
| 5,618,413 A | 4/1997 | Todd et al. |
| 5,690,827 A * | 11/1997 | Simmering et al. ......... 210/602 |
| 5,733,453 A | 3/1998 | DeBusk |
| 5,766,474 A | 6/1998 | Smith et al. |
| 5,785,864 A | 7/1998 | Teran et al. |
| 5,863,433 A | 1/1999 | Behrends |
| 5,876,484 A | 3/1999 | Raskin et al. |
| 5,893,975 A | 4/1999 | Eifert |
| 5,897,777 A | 4/1999 | Zoeller et al. |
| 5,906,745 A | 5/1999 | Eto |
| 5,948,262 A | 9/1999 | Todd et al. |
| 5,951,866 A | 9/1999 | Grove et al. |
| 5,985,149 A | 11/1999 | Raetz et al. |
| 6,086,755 A | 7/2000 | Tepper |
| 6,090,294 A | 7/2000 | Teran et al. |
| 6,126,827 A | 10/2000 | Johnson, Jr. et al. |
| 6,159,371 A | 12/2000 | Dufay |
| 6,171,480 B1 | 1/2001 | Lee et al. |
| 6,200,469 B1 | 3/2001 | Wallace |
| 6,277,274 B1 | 8/2001 | Coffman |
| 6,406,627 B1 | 6/2002 | Wallace |
| 6,447,681 B1 | 9/2002 | Carlberg et al. |
| 6,447,682 B1 | 9/2002 | Flowers |
| 6,531,062 B1 * | 3/2003 | Whitehill ................... 210/602 |

OTHER PUBLICATIONS

Jewell, W. J. et al., "Wastewater Treatment with Plants in Nutrient Films," U.S. Environmental Protection Agency, EPA–600/S2–83–067, pps. 1–5, Oct. 1983.

Jewell, William J., "Anacrobic Sewage Treatment," Environmental Science & Technology, vol. 21, pps. 14–21, Jan. 1987.

Zhu, T. et al., "Phosphorus Sorption and Chemical Characteristics of Lightweight Aggregates (LWA) Potential Filter Media in Treatment Wetlands," Wat. Sci. Tech., vol. 35, No. 5, pps. 103–108, 1997.

Austin, David, "Final Report on The South Burlington, Vermont Advanced Ecologically Engineered System (AEES) for Wastewater Treatment," U.S. Environmental Protection Agency, pps. i–M2, Mar. 4, 2000.

* cited by examiner

INTEGRATED HYDROPONIC AND WETLAND WASTEWATER TREATMENT SYSTEMS AND ASSOCIATED METHODS

CROSS-REFERENCE TO RELATED APPLICATIONS

This application claims priority to provisional application No. 60/333,203, filed on Nov. 14, 2001, entitled "Integrated Hydroponic and Fixed-Film Wastewater Treatment Systems and Associated Methods", and 60/389,637, filed on Jun. 18, 2002, entitled "Residential Wastewater Treatment System and Associated Method". The disclosures of these applications are incorporated hereinto by reference.

BACKGROUND OF THE INVENTION

1. Field of the Invention

The present invention relates to wastewater treatment systems and methods, and, more particularly, to such systems and methods for wastewater treatment that are nonchemically based.

2. Description of Related Art

Wastewater treatment via "natural" means, i.e., without the addition of chemicals, has been accomplished with the use of aquatic and emergent macrophytes (plants) that, in concert with the attendant microorganisms and macroorganisms associated with macrophyte roots and stems, substantially mineralize biodegrade organic materials and substantially remove certain excess nutrients, such as nitrogen and, to a lesser extent, phosphorus. These macrophytes have typically been located in artificial marshlands, also known as constructed wetlands, which are designed for gravity flow. A negative aspect of such systems is that they are very land-intensive, requiring roughly on the order of 100 times as much land area as a conventional treatment plant, or, in terms of capacity, as much as 30–40 acres per $10^6$ gallons of wastewater treated per day unless other treatment processes are incorporated into the constructed wetlands.

Subsurface-flow wetlands, which comprise aquatic plants positioned above a gravel filter, are also known for use in wastewater treatment. These systems have been shown to frequently fail, however. Failure is manifested as the upstream gravel tends to become clogged with biosolids, permitting the influent to bypass the clogged region and pass substantially untreated to a downstream region. Additionally, surface wastewater is a breeding ground for disease vectors and nuisance insects. Ultimately the gravel becomes so clogged that design wastewater treatment is substantially compromised. Plants also appear to have little treatment role in subsurface flow wetlands because the plant root systems are inhibited by conditions in the gravel filter from growing sufficiently long to extend into the gravel, and thus have minimal contact with the influent.

Several varieties of aquatic and emergent macrophytes are known to be used in wetland and aquatic wastewater treatment systems, including, but not limited to, cattails, bulrushes, sedges, and water hyacinths. In wetland treatment systems these plants may be packed in unlined or lined trenches or basins filled with a granular porous medium such as gravel or crushed stone. It has also been suggested to use recycled, shredded scrap tires in the place of the gravel. Another suggested wetland system variant is to place a semipermeable barrier between a lower level into which effluent enters and the plant root system for directing the wastewater flow across the entire plant bed.

In yet another variant, floating aquatic macrophytes, typically water hyacinths, are placed in shallow lagoons where plant roots, with attendant microorganisms and macroorganisms, extending into the water column are a principal design treatment mechanism. Although this root zone treatment method can provide advanced secondary treatment effluent, its application is limited by climate and available sunlight to approximately 5% of the United States. The large treatment footprint of water hyacinth treatment systems prohibits enclosure in greenhouses for almost all economically viable applications.

It is also known to combine plant root zone treatment with conventional activated sludge technology. The principal advantages of combining root zone treatment with activated sludge are improved nutrient removal capability over root zone treatment alone and improved treatment stability in small, activated sludge treatment systems. Among the problems encountered with root zone/activated sludge technology is that the clarifiers employed do not scale well when the size of the system is reduced beyond a certain point. In addition, operator qualifications are high for activated sludge systems, adding to the expense of running the system. Root zone/activated sludge technology has been known to digest in situ a large fraction of the biosolids produced and maintained within the treatment system, thereby reducing system biosolids yield. The mechanism for yield reduction is thought to be the retention of biosolids flocs on plant roots with subsequent consumption and mineralization of flocs by the invertebrate community attendant to the root zone. Reduction of yield is desirable only to a certain point, however. As reactors in series are added, thereby increasing biosolids contact with the root zone, yield may be reduced to the point where an insufficient quantity of biosolids remains to be recycled from the clarifier to the reactors in series. Lack of recycled biosolids substantially degrades the treatment performance of the activated sludge treatment element. This design trap is inherent to root zone/activated sludge treatment systems.

Preliminary studies have been performed on various aspects of the present invention by the inventors and other colleagues, and these have been reported in "Final Report on the South Burlington, Vt. Advanced Ecologically Engineered System (AEES) for. Wastewater Treatment," D. Austin et al., 2000; and "Parallel Performance Comparison between Aquatic Root Zone and Textile Medium Integrated Fixed Film Activated Sludge (IFFAS) Wastewater Treatment Systems," D. Austin, Water Environment Federation, 2001; both of these documents are incorporated herein by reference in their entirety.

SUMMARY OF THE INVENTION

The present invention provides a wastewater treatment system and method that are less land intensive than previous systems, as well as combining the advantages of a plurality of remediation techniques. The present invention has a smaller footprint than previously disclosed wetlands, reduces undesirable characteristics of an influent, and has a low yield, i.e., low proportion of matter needing disposal.

An additional feature of the invention provides a unified environment that includes a remediation system, as well as a method of doing business incorporating the water treatment systems of the present invention.

The wastewater treatment systems and methods of the present invention are amenable to the treatment of, for example, but not intended to be limited to, domestic wastewater, industrial waste or process water, urban runoff, agricultural wastewater or runoff, and even biological sludges. The systems are capable of handling a flow range of approximately 2000–2,000,000 gal/day. The types of contaminants that can be treated in the system include suspended particles, nutrients, metals, simple organics (oxygen-demanding substances), and synthetic or complex organics. The undesirable characteristics typically desired to be remediated include, but are not intended to be limited to, average biological oxygen demand (BOD), average total suspended solids (TSS), total nitrogen, and concentration of oil and grease. The systems of the present invention can reduce BOD to <10 mg/L, TSS to <10 mg/L, and total nitrogen to <10 mg/L.

The water treatment system of the present invention comprises a wastewater inlet, a treated water outlet, and a plurality of treatment modules between the inlet and the outlet. Each module is for treating the water with a selected process. Each module is in fluid communication with at least one other module for permitting sequential treatment of the wastewater by a plurality of processes.

Influent wastewater is first directed to a covered anaerobic reactor, which serves to perform an initial organic and solids removal. In this vessel the solids from the influent settle, and anaerobic bacteria feed on the solids and wastes in the liquid. A filter is provided for removing odors from gases that are produced herein.

A first embodiment of the present invention includes a system for advanced treatment of wastewater. This system comprises an attached growth pretreatment filter that is at least intermittently exposed to atmospheric oxygen. The filter has an inlet for receiving water to be treated.

Following the filter are a first and a second hydroponic reactor, each having an inlet and an outlet. Hydroponic reactors are aerated reactors that have a rigid rack set at the water surface to support plants that send down roots into the wastewater column. The rack preferably covers substantially the entire water surface. Plants preferably substantially cover the entire surface of the rack.

A vertical-flow wetland comprises a basin having an outlet in a bottom thereof, and comprises a plurality of treatment regions through which the water to be treated passes under gravity flow. The basin is adapted to contain a particulate medium, and a mat positioned above the particulate medium is adapted for permitting plants to root therein. The wetland cell is adapted to maintain a population of aquatic invertebrates therein. Water entering the top of the vertical-flow wetland thus passes through a treatment zone formed by the plant roots. Beneath the root zone lies the particulate medium, such as, for example, an expanded shale aggregate for phosphorus absorption, solids filtration, nitrification, and BOD removal.

Water is transferred from the filter outlet to the first reactor inlet, and from the first reactor outlet to the second reactor inlet, and further is distributed from the second reactor outlet across at least a portion of the vertical-flow wetland.

If desired or necessary, water emerging from the vertical-flow wetland may be recycled either to the anaerobic reactor or to the filter for additional treatment. The final effluent may be subjected to additional treatment such as ultraviolet disinfection. The water emerging from the system is then suitable for reuse.

A second embodiment of the system is also directed to a system for advanced treatment of wastewater. This system also comprises an attached growth pretreatment filter that is at least intermittently exposed to atmospheric oxygen. The filter has an inlet for receiving water to be treated.

The system further comprises a first and a second tidal vertical-flow wetland (TVFW). The TVFW can be constructed in a plurality of configurations, and can include a first lagoon that has an inlet for receiving wastewater to be treated and a first vertical flow wetland cell that has an outlet adjacent a bottom thereof. A first means for transporting water from the first lagoon to the first wetland cell is provided.

The TVFW can also include a second lagoon that has an inlet for receiving water from the first wetland cell outlet and a second vertical flow wetland cell that has an outlet adjacent a bottom thereof. A second means for transporting water from the second lagoon to the second wetland cell is provided.

Means for recycling at least a portion of the water exiting the second wetland cell outlet to the first lagoon can also be provided.

Throughout the subsequent discussion, the definitions of lagoon and wetland cell will be generally taken as follows: The first and the second lagoon are adapted to function essentially aerobically and to contain plants having roots positioned to contact water flowing thereinto. The first and the second wetland cell are adapted to contain plants having roots positioned to contact water flowing thereinto.

The integrated TVFW treatment system of the present invention in a particular embodiment includes alternating wetland cells and lagoons. The overall hydraulic regime in this system involves fill and drain cycles wherein wastewater is alternately pumped between cells and lagoons. The vertical flux of water in and out of the wetland cells is designed to cycle over a predetermined period, and is therefore referred to as tidal.

It is to be understood that reference to first and second wetland cells or lagoons in no way limits the total number of wetland cells or lagoons in series. In embodiments where several wetland cells and lagoons are employed the flow regime is a logical serial extension of the flow described herein between the fist and second lagoon/wetland cell pair. For example, recycle flow from the second lagoon wetland cell pair is understood to represent recycle from the final lagoon/wetland cell pair.

Hydraulic design integrates passive forward flow, tidal flow, and recycle flow into one system. The process design in various embodiments integrates wetland and lagoon treatment technology. The process design of the present invention also includes elements of environmental and ecological engineering design that significantly improve the state of the art of wastewater treatment in general, and wetland wastewater treatment in particular.

In the TVFW, wastewater to be treated is subjected to a first substantially aerobic environment containing aquatic invertebrates for a first time period and is transported from the first aerobic environment to a surface of a first substantially anaerobic/anoxic environment containing plants having roots for a second time period. Aquatic invertebrates consume a substantial fraction of biomass produced within the system.

Water emerging from beneath the plant roots of the first anaerobic/anoxic environment is next transported to a second substantially aerobic environment containing aquatic invertebrates for a third time period. Water from the second aerobic environment is then transported to a surface of a second substantially anaerobic/anoxic environment containing plants having roots for a fourth time period. Aquatic invertebrates consume a substantial fraction of biomass produced within the system.

At least a portion of the water emerging from beneath the plant roots of the second anaerobic/anoxic environment is then recycled to the first aerobic environment.

Water is distributed from the filter outlet across at least a portion of a surface of the first wetland and also from a bottom of the first wetland across at least a portion of a surface of the second wetland. Water is also recycled from a bottom of the second wetland to a location downstream of the filter.

If desired or necessary, water emerging from the second TVFW may be recycled either to the anaerobic reactor or to the filter for additional treatment. The final effluent may be subjected to additional treatment such as ultraviolet disinfection. The water emerging from the system is then suitable for many reuse applications requiring wastewater treated to advanced standards. The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
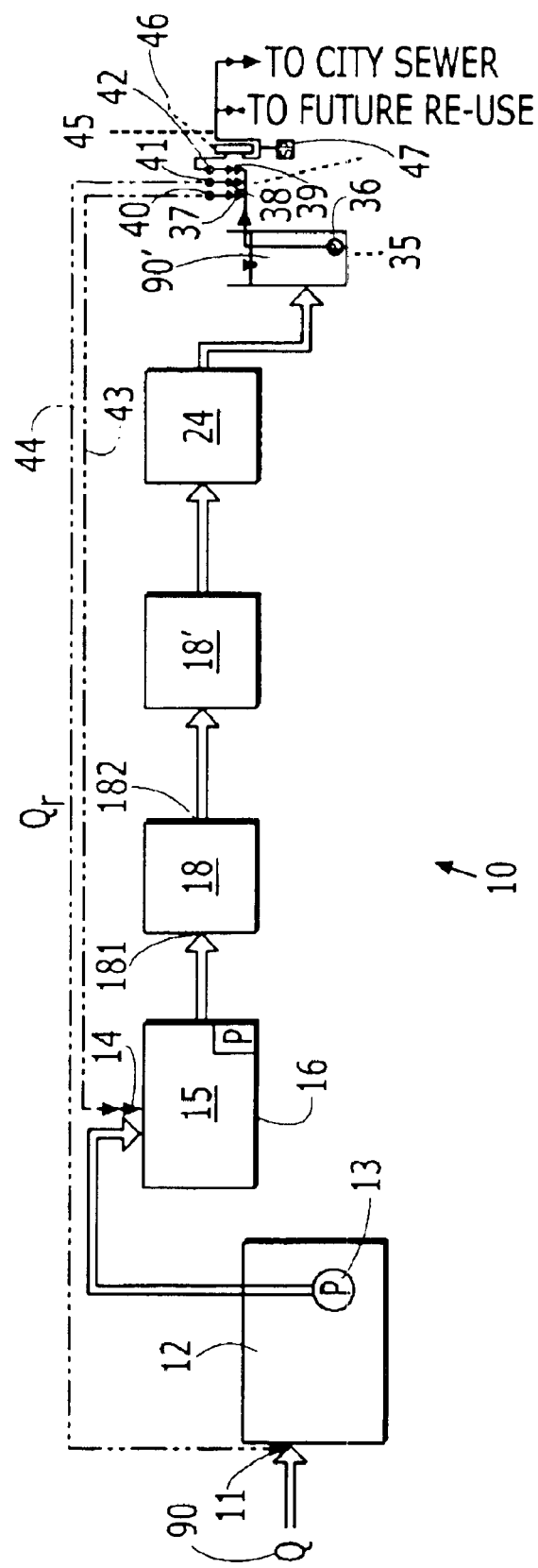
FIG. 1 is a schematic diagram of the first embodiment of the present invention.

A description of the preferred embodiments of the present invention will now be presented with reference to FIGS. 1–6.

A schematic of a first embodiment of the present invention (FIG. 1) illustrates the flows through this system 10, beginning with wastewater influent 90 entering via an inlet 11 into a covered anaerobic reactor 12, which serves to perform an initial organic and solids removal. In this vessel 12 the solids from the influent 90 settle, and anaerobic bacteria feed on the solids and wastes in the liquid.

Following treatment in the anaerobic reactor 12 for a predetermined period, for example, in a particular embodiment 1.5 days comprises an exemplary retention time, the wastewater 90 is channeled via a pump 13 to the inlet 14 of an attached growth pretreatment filter 15. This filter 15 is at least intermittently exposed to atmospheric oxygen. The filter 15 achieves removal of organics and solids and denitrification.

Figure 2:
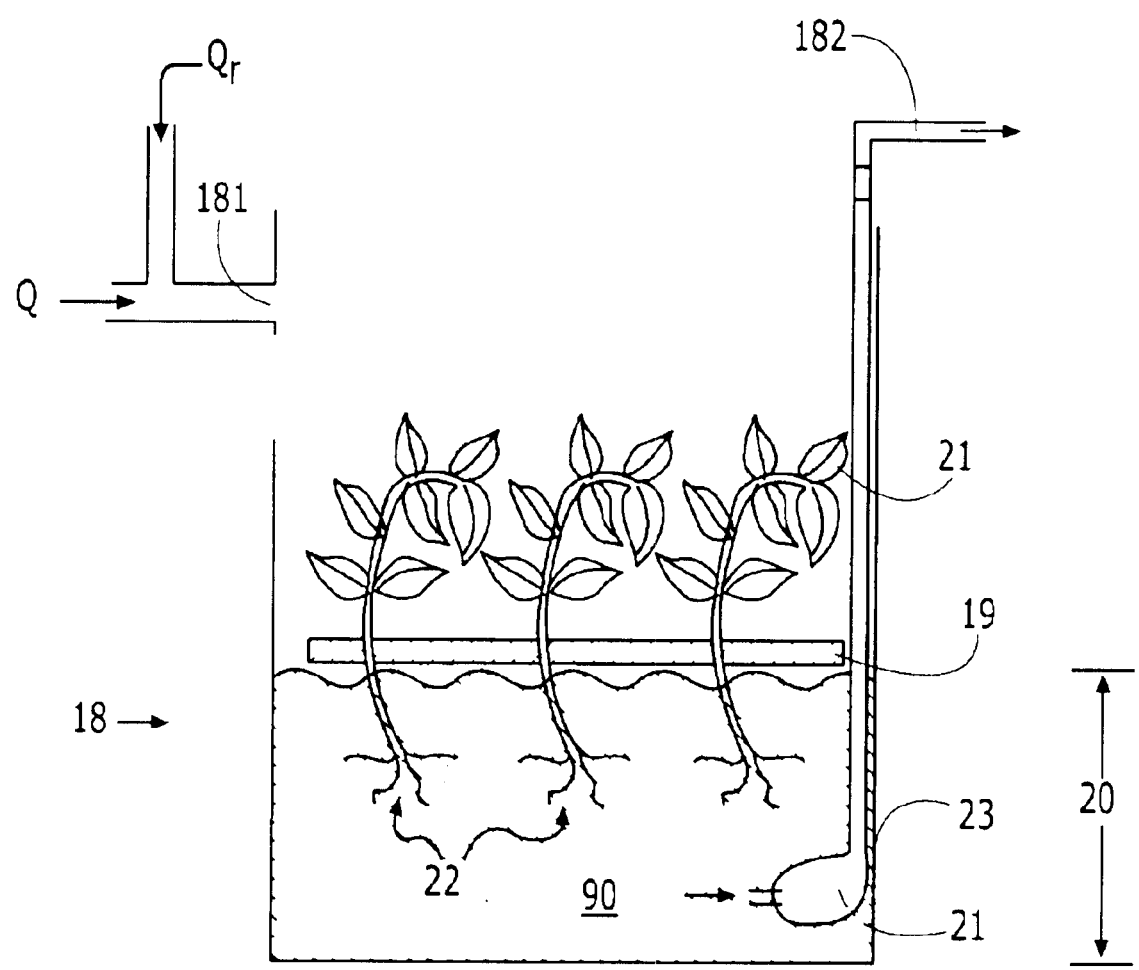
FIG. 2 is a cross-sectional view of an exemplary hydroponic reactor (lagoon) of the present invention.

Fluid is collected from the bottom 16 of the filter 15 and is pumped 17 to an inlet 181 of a first hydroponic reactor 18 (FIG. 2). Herein the term hydroponic reactor is taken to comprise an aerated reactor vessel 23 that has a substantially rigid rack 19 set at the surface of water 90 in the reactor 18. The rack 19 supports plants 21 that send down roots 22 into the wastewater column 20. Preferably the rack 19 covers substantially the entire water surface. Also preferably the plants 21 cover substantially the entire surface of the rack 19.

Water from the first hydroponic reactor 18 is pumped 21 or flows by gravity from an outlet 182 to a second hydroponic reactor 18' that is substantially identical to the first 18.

Water from the second hydroponic reactor 18' is then pumped or flows by gravity to the top of a vertical-flow wetland 24 (FIG. 3), where a distribution manifold 25 doses the surface of the wetland 24 for downward, gravity-driven flow through a plurality of zones. The wetland 24 continues BOD removal, nitrifies and denitrifies, and removes TSS. The manifold 25 is pressurized sufficiently to ensure adequate distribution across manifold orifices or outlets, and the spacing of orifices or outlets 26 therein is on a spacing of, for example, 1-ft centers. The use of vertical-flow wetland technology can reduce the footprint of the process by 50–75%.

The wetland 24 comprises a top dressing 27 that may comprise in certain embodiments, a layer of soil, for example, 6 in. The soil 27 comprises in a preferred embodiment a slightly limiting soil, with a percolation of 2 in./min, with no particle size >2 mm, that is, coarse sand. The purpose of the top dressing 27 is to prevent public exposure to the wastewater in the wetland 24, to control odors, and to improve appearance. The top dressing 27 is placed in covering relation to the distribution manifold 25.

Beneath the distribution manifold 25 is positioned a layer of wetland sod 28, which in a preferred embodiment comprises a cocoanut fiber matting known as "Coir" that is embeddable with wetland plants 29. The wetland plants 29 provide an extensive root 30 mat, which preferably cover approximately 70% of the mat 28 bottom, and comprises an aquatic root zone. The sod 28 preferably covers substantially the entire surface of the wetland 24. The distribution manifold 25 atop the sod 28 causes influent flow to pass through the root mat 30 of the plants, which diversifies the microbial community and removes BOD and TSS. The root mat 30 and the sod 28 act as a prefilter to the lower-lying zones. The root mat 30 at the level of the wetland sod 28 is preferably not flooded for extended periods in order to maintain aerobic conditions.

The species of plants 29 have been empirically verified as being hardy under conditions of wastewater loading of the particular site in which they are being employed. The wetland sod 28 permits effective installation of healthy plants 29 to enable the creation of a substantially "instant" wetland litter layer 24 that is habitat for many invertebrate species associated with wetland ecosystems in nature.

The next zone beneath the wetland sod 28 comprises a layer of manufactured medium 31 comprising, for example, random-packed plastic medium such as high-density polyethylene or polyethylene, having a depth of approximately 1.0–3.0 feet. The purpose of this medium 31 is BOD removal, TSS removal, and nitrification over the provided high surface area of the medium. The plastic medium 31 permits easy penetration of plant roots and a reliably moist and aerobic environment for detritivores to thrive on biofilms growing from wastewater nutrients. In a preferred embodiment, not intended to be limiting, the medium comprises textured cylindrical pieces approximately 4–10 mm in diameter, and having a height smaller than the diameter. The medium's 31 porosity is approximately 90%. The thin-film chemistry on the medium enhances BOD removal and nitrification, and the bulk liquid chemistry in the flooded state enhances denitrification by the rapid formation of anoxic conditions. The frequent (e.g., several times per day) exposure of biofilms formed on the medium assists in the decomposition of the biofilms into trace organics, carbon dioxide, and water.

Effluent trickles through the media/root mixture in thin films and then enters a layer of lightweight aggregate 311 of particle diameter substantially not less than one millimeter. The aggregate comprises a manufactured aggregate of consistent quality that can be penetrated by plant roots. Remaining suspended solids are filtered out in the aggregate layer. Nitrification also takes place in the aggregate layer 311.

The next lower-lying zone comprises a rock or gravel aggregate layer 32, preferably expanded shale aggregate, most preferably with a particle diameter not substantially less than four millimeters. The purpose of this layer 32 is phosphorus absorption, TSS filtration, nitrification, and BOD removal. The bulk liquid chemistry in the flooded state enhances denitrification by rapid formation of anoxic conditions. In a preferred embodiment the depth of this layer 32 is approximately 1.5–2.0 feet. Preferably this layer 32 is intermittently flooded, during which time the gravel layer 32 becomes anoxic. A portion of waste nitrified in the layers above are denitrified in the flooded section. As the liquid level of the flooded gravel layer 32 rises, a drainage device is triggered, draining the entire gravel layer 32 through a bottom drain system. Draining the gravel layer 32 pulls air into the gravel interstices, and exposure of biofilms to air prevents buildup of biofilms that could clog the gravel layer 32.

Beneath the rock/gravel aggregate layer 32 is positioned an under-drain 33 having a plurality of holes 34 for collecting fluid draining through the rock aggregate layer 32. The under-drain 33 effluent flows to an effluent pump vault 35, which controls the elevation of the wetland 24 and contains a pump 36 that lifts effluent 90' to a series of valves 37–39, each with flow meters 40–42 attached thereto, leading to two recycling paths 43,44 and to a discharge 45. The effluent 90' to be recycled is channeled either to the anaerobic reactor 12 (path 44) or to the fixed-film reactor 15 (path 43) for additional treatment. The final effluent 90' is typically spit between the recycling path 45 and a discharge 45 at a predetermined ratio, such as 3:1, although this is not intended as a limitation.

The rate of recycling preferably recycles an average drop of water from the primary tank 12 1–5 times, which permits a high level of treatment in the wetland 24.

The discharge 45 may lead to an additional treatment device such as an ultraviolet disinfection module 46. The water emerging from the system 10 is then suitable for reuse, and a second sample port 47 is provided for additional testing.

Discharge 45 can include discharge by gravity directly to a leach field or soil absorption system, discharge to a subsurface irrigation system, and, where allowed by local regulations, discharge to surface irrigation. Subsurface irrigation may include, for example, a pump and a plurality of small, flexible pipes with emitter openings. The irrigation distribution network preferably lies close to the surface in warm climates in the biologically active root zone area of soil.

In a second embodiment of the invention, the system 50 (FIG. 4) comprises a pretreatment module 51 into which influent 90 is channeled and permitted to reside for a predetermined period. The wastewater 90 is then channeled to via a pump 52 to the inlet 14 of an attached growth pretreatment filter 15 as above. This filter 15 is at least intermittently exposed to atmospheric oxygen. The filter 15 achieves removal of organics and solids and denitrification.

Water from the filter 15 is transferred to a pair 53,54 of tidal vertical-flow wetlands (TVFW), each of which comprises alternating series of lagoons 55 and VF wetland cells 56. Each lagoon 55 (FIG. 2) is comparable to the hydroponic reactor 18 discussed above. Each lagoon 55 is adapted to maintain a population of grazing aquatic invertebrates, such as, for example, filter-feeding zooplankton.

Figure 3:
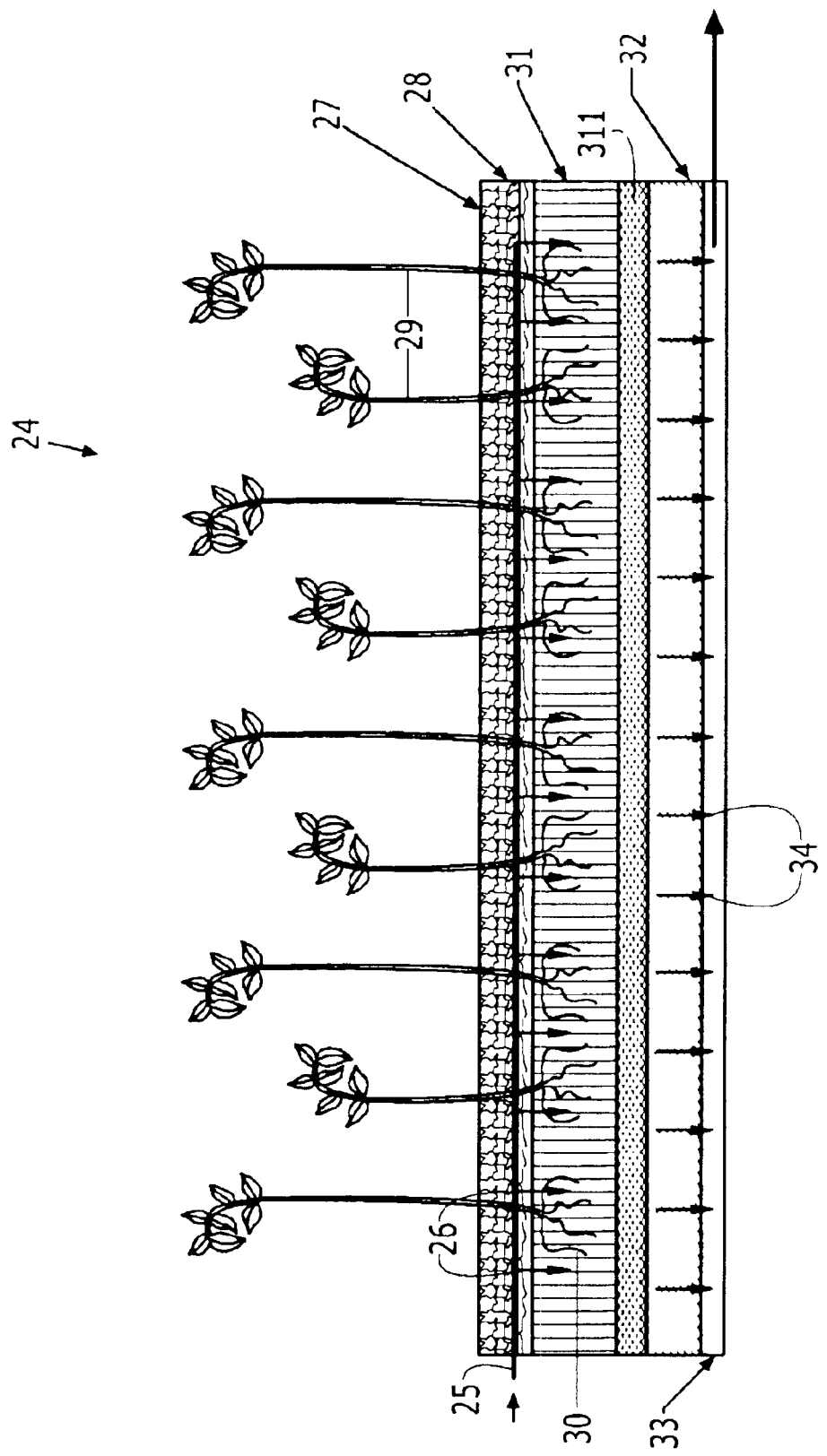
FIG. 3 is a side cross-sectional view of a vertical-flow wetland module of the embodiment of FIG. 1.
Figure 4:
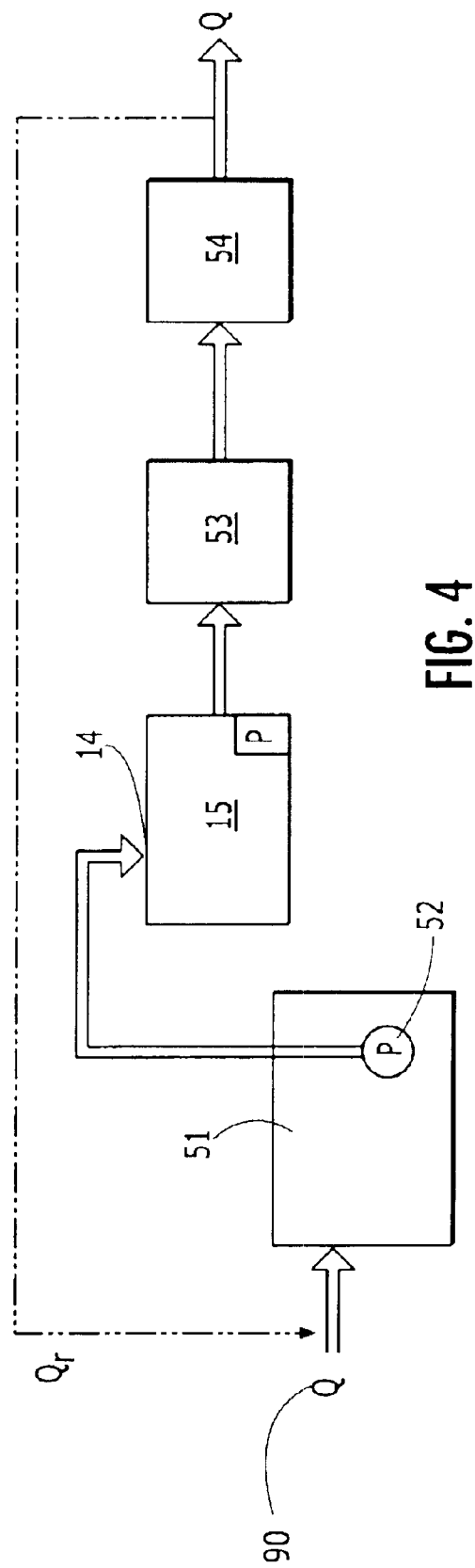
FIG. 4 is a schematic diagram of the second embodiment of the present invention.

Each wetland cell 56 comprises a module 24 as illustrated in FIG. 3. The wetland cell 56 has a depth 67 that is less than that 58 of the lagoon 55. However, the surface area of the lagoon 55 is preferably substantially smaller than that of the wetland cell 56. The wetland cell 56 is adapted to maintain a population of aquatic invertebrates, such as, but not intended to be limited to, detritivores.

Figure 5:
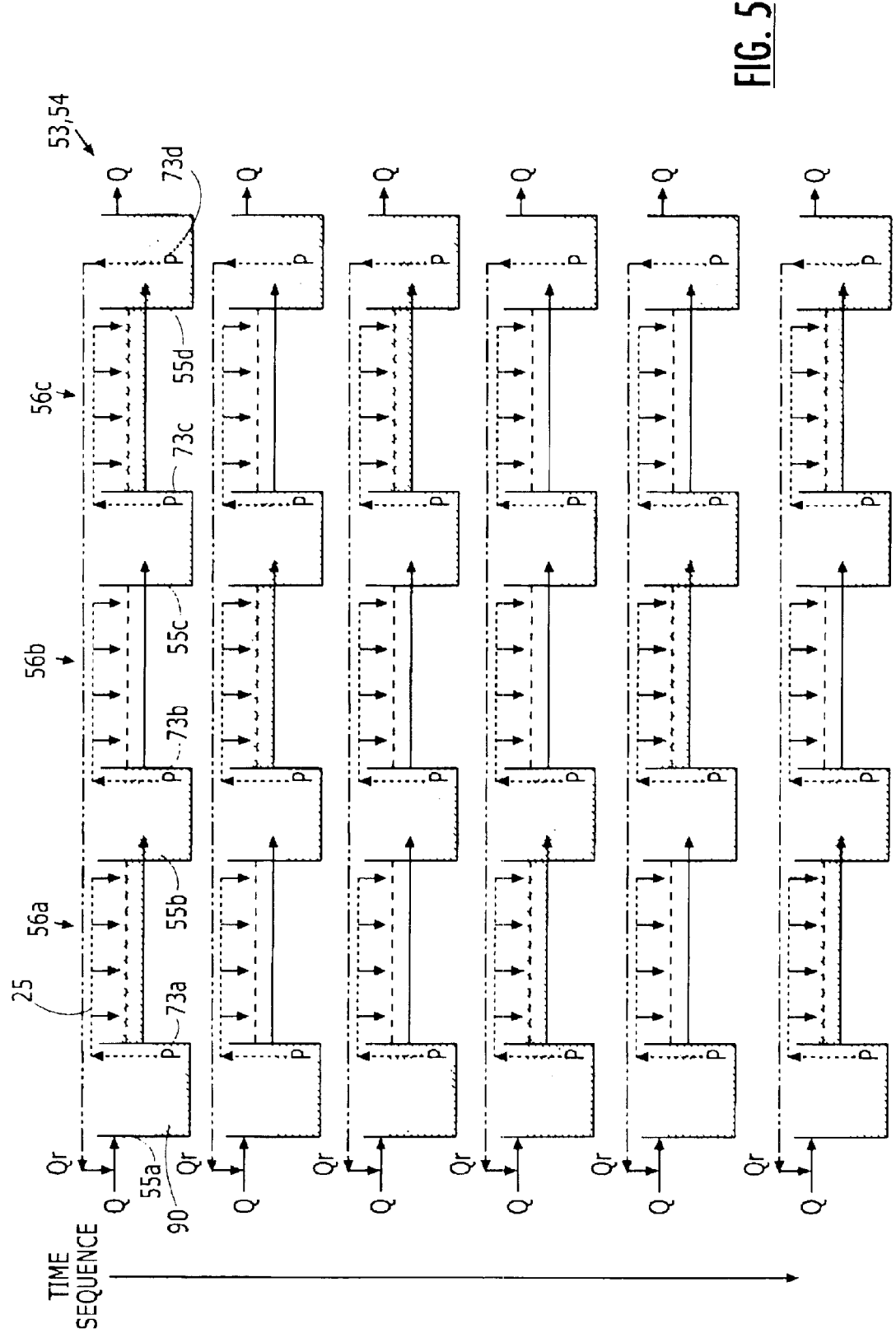
FIG. 5 is a schematic diagram of an exemplary time sequence of water flow between portions of the system of the present invention.
Figure 6:
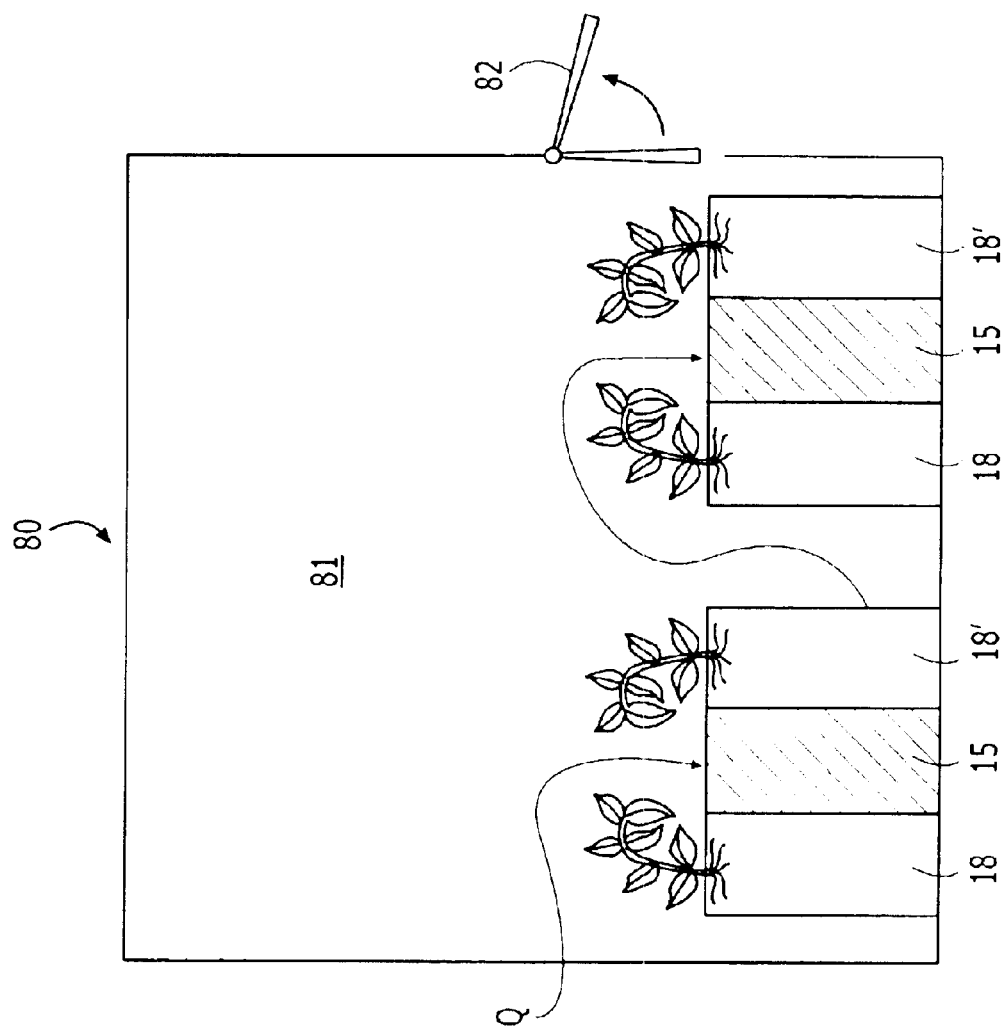
FIG. 6 is a schematic illustration of a unified environment of the present invention.

Each TVFW 53,54 may comprise a plurality of wetland cells 56a–56c and lagoons 55a–55d, alternating as shown in FIG. 5. Q represents forward flow; $Q_r$, recycle flow. The overflow piping between wetland cells 56a–56c and lagoons 55a–55d is not depicted. The dashed horizontal line in the wetland cells 56a–56c represents the media/plant root surface. The overall hydraulic regime in the TVFW 53,54 involves fill and drain cycles where wastewater is alternately pumped and flows between cells 56 and lagoons 55. The vertical flux of water in and out of the wetland cells 56a–56c is designed to cycle over a predetermined period of, for example, at least once per day, and is therefore referred to as tidal.

Means for transporting water between the lagoons 55a–55c and wetland cells 56a–56c alternately are provided, as well as recycling between the fourth lagoon 55d and the first lagoon 55a. These may comprise, for example, pump stations 73a–73d associated with each lagoon 55a–55d (FIG. 5). Generally water flows from the wetland cells 56a–56c into their respective lagoons 55b–55d passively, as will be discussed in the following. In some embodiments, a pump station alone may be used without an associated lagoon 55.

In the embodiment shown in FIG. 5, for example, the pump 73a in the lagoon 55 has an intake positioned lower in the lagoon basin than the lagoon inlet. A level sensor may be employed in certain embodiments for activating the pump when a level of water in the lagoon 55 reaches a predetermined depth, for example, to prevent flooding.

In a particular embodiment (FIG. 5), the recycling pump 74d is adapted to recycle a water portion in a range of 50–500% of the wastewater volume entering the first lagoon 55a per unit time. Recycle ratios will be discussed further in the following.

Piping is also provided for connecting a pump discharge with its downstream wetland cell. In a particular embodiment a check valve can be positioned in the pipe for permitting flow toward the wetland cell 56, and for preventing return flow. The piping is in fluid communication with the distribution pipe 25, which has a plurality of holes for permitting spreading of the water exiting the upstream lagoon 55 over the surface of the wetland cell 56.

A unified environmental space 80 (FIG. 6) includes the systems 10,50 of the present invention and their associated elements. For example, the systems 10,50 may be positionable within a solarium-type room 81 that has windows 82 that are automatically openable in response to inside and outside temperatures to optimize comfort of the inhabitants and operation of the systems 10,50.

This unified environmental space 80 may also form a part of a business method, wherein an offer is made to a customer to sell or lease a living space including one of the systems 10,50 described above.

The systems 10,50 of the present invention provide advanced, onsite treatment of wastewater, which has typically been achieved with septic tanks and leach fields. Better onsite treatment is desirable to protect groundwater resources.

The systems 10,50 may be included within or attached to a single home, a group of residences, or a unit such as a hotel or resort, with the wetland components requiring sunlight that is accessible either out of doors or within a sunroom-type enclosure.

The systems 10,50 provide the minimum design treatment standards listed in Table 1.

TABLE 1

Minimum Design Treatment Standards

| Parameter | Effluent Standard | Note |
|---|---|---|
| $BOD_5$ | <15 mg/L | <5 mg/L achievable in some embodiments |
| Total nitrogen | <15 mg/L | <5 mg/L achievable in some embodiments |
| Ammonia | <3 mg/L | <0.2 mg/L achievable in some embodiments |
| Phosphorus | 30% removal | 100% of phosphorus is absorbed in most soils if subsurface effluent dispersal is used |
| TSS | <15 mg/L | <5 mg/L achievable in some embodiments |
| Fecal coliforms | <100 cfu/100 ml | If ultraviolet disinfection used |

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for advanced treatment of wastewater comprising:
    an attached growth pretreatment filter at least intermittently exposed to atmospheric oxygen, the filter having an inlet for receiving water to be treated;
    a first and a second hydroponic reactor, each having an inlet and an outlet;
    a vertical-flow wetland comprising a basin having an outlet in a bottom thereof, the basin adapted to contain a particulate medium, and a mat adapted for permitting plants to root therein, the mat positioned above the particulate medium, the wetland cell adapted to maintain a population of aquatic invertebrates therein;
    first means for transferring water from the filter outlet to the first reactor inlet;
    second means for transferring water from the first reactor outlet to the second reactor inlet; and
    means for distributing water from the second reactor outlet across at least a portion of the vertical-flow wetland.

2. The system recited in claim 1, wherein the filter inlet is adapted to receive water to be treated from a primary tank.

3. The system recited in claim 2, further comprising the primary tank.

4. The system recited in claim 3, wherein the primary tank comprises a passive anaerobic reactor and settling basin.

5. The system recited in claim 4, further comprising an effluent filter positioned along a flow pathway between the primary tank and the pretreatment filter.

6. The system recited in claim 1, wherein the first water transferring means further comprises means for transferring water from the filter outlet to the primary tank.

7. The system recited in claim 6, wherein the first water transferring means comprises a pump and a flow splitter for dividing water from the filter outlet between the primary tank and the first reactor.

8. The system recited in claim 1, wherein the first and the second reactor each comprises a basin having an inlet and an outlet, and a rack positionable at a surface of water in the basin for supporting plants thereon.

9. The system recited in claim 1, wherein the water distributing means comprises a distribution manifold positioned atop the mat and the wetland further comprises a dressing material positioned atop the distribution manifold.

10. The system recited in claim 1, wherein the particulate medium comprises a layer of plastic media adapted to support a growth of a biofilm thereon and to permit plant root growth thereinto, the plastic media layer positioned beneath the mat.

11. The system recited in claim 10, wherein the particulate medium further comprises a layer of manufactured aggregate penetrable by plant roots, the manufactured aggregate layer positioned beneath the plastic media layer.

12. The system recited in claim 11, wherein the particulate medium further comprises a layer of gravel positioned beneath the manufactured aggregate layer.

13. The system recited in claim 12, further comprising means for draining the gravel layer, for exposing the gravel layer to air.

14. The system recited in claim 1, further comprising a drainage sump in fluid communication with the wetland outlet and a flow splitting basin for receiving water from the drainage sump and for dividing the received water among the primary tank, the filter, and a basin discharge outlet.

15. The system recited in claim 14, further comprising an ultraviolet disinfection device positioned to treat water emerging from the basin discharge outlet.

16. A system for advanced treatment of wastewater comprising:
    an attached growth pretreatment filter at least intermittently exposed to atmospheric oxygen, the filter having an inlet for receiving water to be treated;
    a first and a second tidal vertical-flow wetland, each comprising:
        a first lagoon having an inlet for receiving wastewater to be treated;
        a first vertical flow wetland cell having an outlet adjacent a bottom thereof;
        first means for transporting water from the first lagoon to the first wetland cell;
        a second lagoon having an inlet for receiving water from the first wetland cell outlet;
        a second vertical flow wetland cell having an outlet adjacent a bottom thereof;

second means for transporting water from the second lagoon to the second wetland cell; and means for recycling at least a portion of the water exiting the second wetland cell outlet to the first lagoon, wherein:

the first and the second lagoon are adapted to function essentially aerobically and to contain plants having roots positioned to contact water flowing thereinto; and the first and the second wetland cell are adapted to contain plants having roots positioned to contact water flowing thereinto;

first means for distributing water from the filter outlet to the first lagoon of the first wetland;

second means for distributing water from an outlet of the first wetland to the first lagoon of the second wetland; and means for recycling water from an outlet of the second wetland to a location upstream of the filter.

17. The system recited in claim 16, wherein the filter inlet is adapted to receive water to be treated from a primary tank.

18. The system recited in claim 17, further comprising the primary tank.

19. The system recited in claim 18, wherein the primary tank comprises a passive anaerobic reactor and settling basin.

20. The system recited in claim 19, further comprising an effluent filter positioned along a flow pathway between the primary tank and the pretreatment filter.

21. The system recited in claim 16, further comprising an ultraviolet disinfection device positioned to treat water emerging from the second wetland outlet.

22. A method for achieving advanced treatment of wastewater comprising the steps of:

filtering water to be treated with an attached growth pretreatment filter at least intermittently exposed to atmospheric oxygen;

transferring water from a filter outlet to an inlet of a first hydroponic reactor;

channeling water from an outlet of the first hydroponic reactor to an inlet of a second hydroponic reactor; and distributing water from an outlet of the second hydroponic reactor to a vertical-flow wetland comprising a basin having an outlet in a bottom thereof, the basin adapted to contain a particulate medium, and a mat adapted for permitting plants to root therein, the mat positioned above the particulate medium, the wetland cell adapted to maintain a population of aquatic invertebrates therein.

23. The method recited in claim 22, wherein an inlet of the filter is adapted to receive water to be treated from a primary tank.

24. The method recited in claim 23, further comprising transferring water to be treated to the filter from a primary tank.

25. The method recited in claim 24, wherein the primary tank comprises a passive anaerobic reactor and settling basin.

26. The method recited in claim 25, further comprising the step of filtering water from the primary tank with an effluent filter positioned along a flow pathway between the primary tank and the pretreatment filter.

27. The method recited in claim 22, further comprising the step of transferring water from the filter outlet to a primary tank.

28. The method recited in claim 27, wherein the transferring step comprises dividing water from the filter outlet between the primary tank and the first reactor.

29. The method recited in claim 22, wherein the first and the second reactor each comprises a basin having an inlet and an outlet, and a rack positionable at a surface of water in the basin for supporting plants thereon.

30. The method recited in claim 22, wherein the water distributing step comprises positioning a distribution manifold atop the mat and the wetland further comprises a dressing material positioned atop the distribution manifold.

31. The method recited in claim 22, wherein the particulate medium comprises a layer of plastic media adapted to support a growth of a biofilm thereon and to permit plant root growth thereinto, the plastic media layer positioned beneath the mat.

32. The method recited in claim 31, wherein the particulate medium further comprises a layer of manufactured aggregate penetrable by plant roots, the manufactured aggregate layer positioned beneath the plastic media layer.

33. The method recited in claim 32, wherein the particulate medium further comprises a layer of gravel positioned beneath the manufactured aggregate layer.

34. The method recited in claim 33, further comprising the step of draining the gravel layer, for exposing the gravel layer to air.

35. The method recited in claim 22, further comprising channeling water exiting the wetland outlet to a drainage sump and dividing the water from the drainage sump among the primary tank, the filter, and a basin discharge outlet.

36. The method recited in claim 35, further comprising the step of treating water emerging from the basin discharge outlet with ultraviolet disinfection.

37. A method for advanced treatment of wastewater comprising the steps of:

receiving water to be treated into an attached growth pretreatment filter at least intermittently exposed to atmospheric oxygen;

distributing water exiting the filter to a first tidal vertical-flow wetland comprising, in flow series, a first lagoon, a first wetland, a second lagoon, and a second wetland;

distributing water from an outlet of the first wetland to a second tidal vertical-flow wetland comprising, in flow series, a first lagoon, a first wetland, a second lagoon, and a second wetland; and recycling water from an outlet of the second wetland to a location upstream of the filter.

38. The method recited in claim 37, wherein the filter inlet is adapted to receive water to be treated from a primary tank.

39. The method recited in claim 38, further comprising the step of transferring water from a source to the primary tank.

40. The method recited in claim 39, wherein the primary tank comprises a passive anaerobic reactor and settling basin.

41. The method recited in claim 40, further comprising filtering water from the primary tank using an effluent filter positioned along a flow pathway between the primary tank and the pretreatment filter.

42. The method recited in claim 37, further comprising the step of treating water emerging from the second wetland outlet with an ultraviolet disinfection device.

\* \* \* \* \*